(12) United States Patent
Cui et al.

(10) Patent No.: US 12,236,217 B2
(45) Date of Patent: Feb. 25, 2025

(54) TRANSFORMATION OF COMPUTER CODE BASED ON IDIOM RECOGNITION AND VALUE CONSTRAINT ANALYSIS

(71) Applicant: INTERNATIONAL BUSINESS MACHINES CORPORATION, Armonk, NY (US)

(72) Inventors: Shimin Cui, North York (CA); Wai Hung Tsang, Markham (CA); Hubert Shun Kwan Tong, Scarborough (CA); Wei Huang, Scarborough (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/644,730

(22) Filed: Dec. 16, 2021

(65) Prior Publication Data

US 2023/0195434 A1 Jun. 22, 2023

(51) Int. Cl.
*G06F 8/41* (2018.01)
(52) U.S. Cl.
CPC ...................................... *G06F 8/41* (2013.01)
(58) Field of Classification Search
None
See application file for complete search history.

(56) References Cited

U.S. PATENT DOCUMENTS

| 7,203,932 | B1 | 4/2007 | Gaudet et al. | |
| 2009/0119654 | A1* | 5/2009 | Kawahito | G06F 8/4435 717/154 |
| 2017/0161177 | A1* | 6/2017 | Bird | G06F 11/3672 |

FOREIGN PATENT DOCUMENTS

WO WO2010070384 A1 6/2010

OTHER PUBLICATIONS

Motohiro Kawahito, "A New Idiom Recognition Framework for Exploiting Hardware-Assist Instructions", 2006, ASPLOS (Year: 2006).*
Mell, Peter and Tim Grance, "The NIST Definition of Cloud Computing," National Institute of Standards and Technology, Information Technology Laboratory, Special Publication 800-145, Sep. 2011, pp. 1-7.

(Continued)

*Primary Examiner* — Lewis A Bullock, Jr.
*Assistant Examiner* — Mark A Gooray
(74) *Attorney, Agent, or Firm* — Eric Chesley, Esq.; Blanche E. Schiller, Esq.; Heslin Rothenberg Farley & Mesiti P.C.

(57) ABSTRACT

Code pattern matching is performed within computer code to determine whether the computer code includes an idiom from a predefined set of idioms. Based on determining that the computer code includes the idiom, a set of data items of the idiom to be analyzed is determined. The set of data items is analyzed with respect to one or more corresponding values from the computer code based on a set of constraints defined for the idiom to determine whether the set of data items satisfy one or more predefined conditions for the idiom. Based on the analyzing indicating that the one or more predefined conditions are satisfied, one or more code segments of the computer code including the idiom are replaced with replacement code to provide revised computer code.

20 Claims, 5 Drawing Sheets

(56) References Cited

OTHER PUBLICATIONS

Kawahito, Motohiro et al., "A New Idiom Recognition Framework for Exploiting Hardware-Assist Instructions," ASPLOS'06, Oct. 21, 2016, pp. 382-393.
Ginsbach, Philip et al., "Automatic Matching of Legacy Code to Heterogeneous APIs: Idiomatic Approach,"ASPLOS'18, Mar. 24, 2018, pp. 139-153.
Olschanowsky, Catherine et al., "PIR: PMaC's Idiom Recognizer," 39th International Conference on Parallel Processing, ICPP Workshops 2010, San Diego, California, USA, Sep. 13, 2010, pp. 1-8.
DeCarvalho, João et al., "KernelFaRer: Replacing Native-Code Idioms with High-Performance Library Calls," Jun. 2021, pp. 1-9.
Kawahito, Motohiro et al., "Idiom Recognition Framework Using Topological Embedding," ACM Transactions on Architecture and Code Optimization, vol. 10, No. 3, Article 13, Sep. 2013, pp. 13:1-13:34.
Grace Period Disclosure: IBM® Open XL C/C++ Compiler, Sep. 2021, (7 pages), https://www.ibm.com/products/xl-cpp-aix-compiler-power.
Grace Period Disclosure: IBM® Open XL Fortran Compiler, Sep. 2021, (6 pages), https://www.ibm.com/products/xl-fortran-aix-compiler-power.
Transmittal Letter Regarding Confidential Activity, Dec. 17, 2021, (1 page).

* cited by examiner

TRANSFORMATION OF COMPUTER CODE BASED ON IDIOM RECOGNITION AND VALUE CONSTRAINT ANALYSIS

STATEMENT REGARDING PRIOR DISCLOSURES

The following disclosure(s) are submitted under 35 U.S.C. 102(b)(1)(A):

DISCLOSURE(S): IBM® Open XL C/C++ Compiler. September 2021; and IBM® Open XL Fortran Compiler. September 2021.

BACKGROUND

One or more aspects relate, in general, to processing within a computing environment, and in particular, to facilitating such processing.

Processing within a computing environment includes executing computer programs that perform various tasks. Programs are typically written in a program code, referred to as source code, which is not understood by a machine, such as a computer. However, the source code is translated to machine code, referred to as machine language, which is understandable by a computer. This translation may be performed using a compiler. There are many available compilers, and different compilers offer different features. One feature that is offered is an optimization feature in which one or more optimizations are applied to the program to enhance program performance.

For example, compiler optimization techniques have been developed to search for instances of specific patterns in source code and to replace them with other code considered more efficient. Enhancements to such optimization techniques continue to be sought.

SUMMARY

Shortcomings of the prior art are overcome, and additional advantages are provided through the provision of a computer program product for facilitating processing within a computing environment. The computer program product includes one or more computer readable storage media and program instructions collectively stored on the one or more computer readable storage media to perform a method. The method includes performing code pattern matching within computer code to determine whether the computer code includes an idiom from a predefined set of idioms. Based on determining that the computer code includes the idiom, a set of data items of the idiom to be analyzed is determined. The set of data items is analyzed with respect to one or more corresponding values from the computer code based on a set of constraints defined for the idiom to determine whether the set of data items satisfy one or more predefined conditions for the idiom. Based on the analyzing indicating that the one or more predefined conditions are satisfied, one or more code segments of the computer code including the idiom are replaced with replacement code to provide revised computer code.

Computer-implemented methods and computer systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In one or more aspects, a capability is provided to facilitate processing within a computing environment. For instance, processing is facilitated by optimizing computer code executing on a processor, improving performance of the computer code and the computing environment in which the code executes.

In one or more aspects, a multi-phase idiom recognition process is provided to improve performance in execution of compiled code. The process includes, for instance, performing code pattern matching recognition for predefined idiom templates and recording a set of constants and variables for further value constraint analysis; and performing value constraint analysis to ensure the constants and variables recorded satisfy predefined conditions for a matched idiom.

Figure 1:
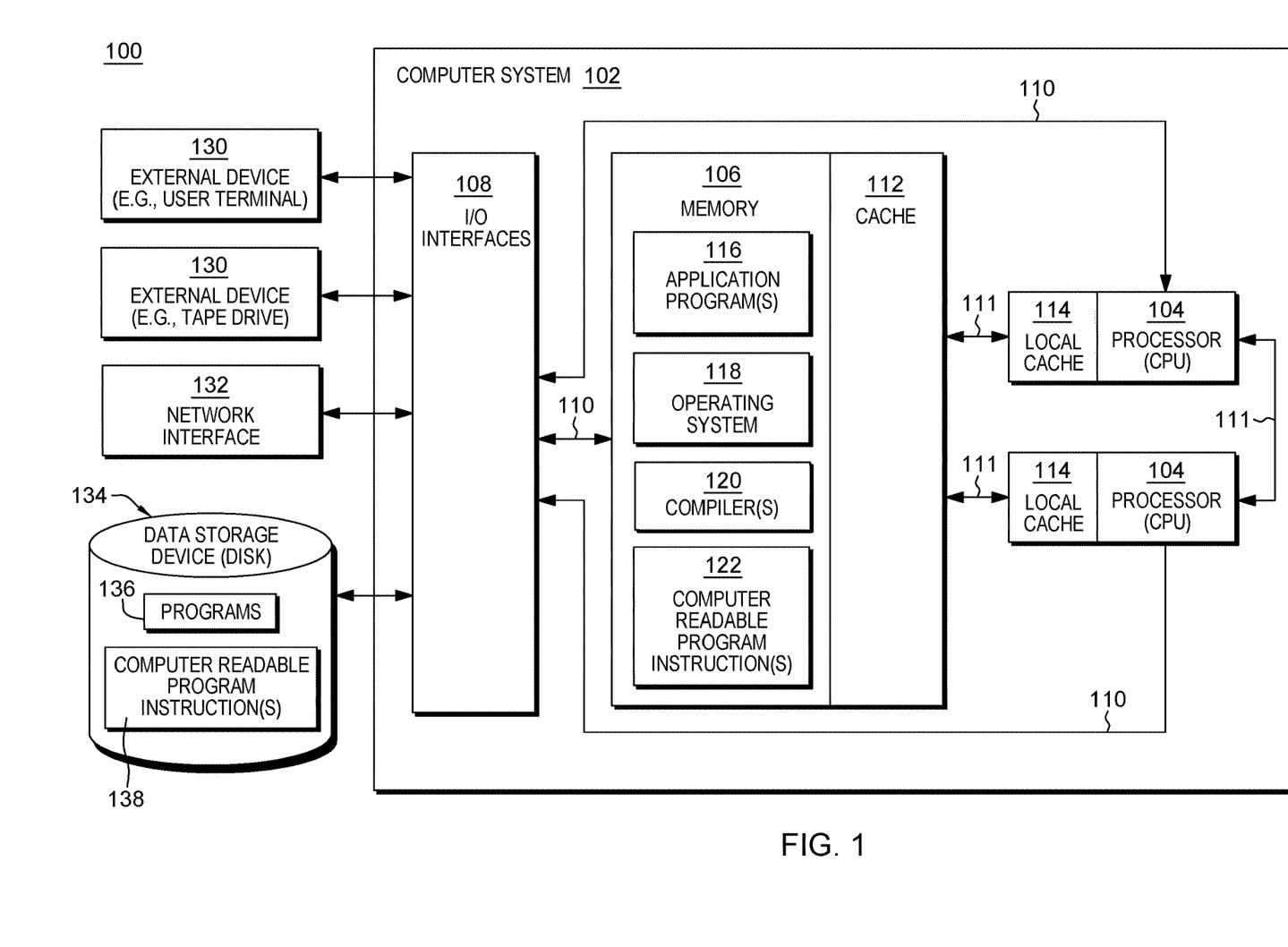
FIG. 1 depicts one example of a computing environment to include and/or use one or more aspects of the present invention.

In one aspect, the process is performed by e.g., a processor, and in one example, by a compiler executing on a processor. One example of a computing environment executing such a processor is described with reference to FIG. 1. As an example, the computing environment of FIG. 1 is based on the IBM® Power® instruction set architecture offered by International Business Machines Corporation, Armonk, New York. However, the Power instruction set architecture is only one instruction set architecture to be used; other instruction set architectures offered by International Business Machines Corporation and/or other corporations, entities, etc. may be used. IBM and Power are registered trademarks or trademarks of International Business Machines Corporation in at least one jurisdiction.

Referring to FIG. 1, in one example, a computing environment 100 includes, for instance, a computer system 102 shown, e.g., in the form of a general-purpose computing device. Computer system 102 may include, but is not limited to, one or more processors or processing units 104 (e.g., central processing units (CPUs) and/or special-purpose processors, etc.), a memory 106 (a.k.a., system memory, main memory, main storage, central storage or storage, as examples), and one or more input/output (I/O) interfaces 108, coupled to one another via one or more buses and/or other connections. For instance, processors 104 and memory 106 are coupled to I/O interfaces 108 via one or more buses 110, and processors 104 are coupled to one another via one or more buses 111.

Bus 111 is, for instance, a memory or cache coherence bus, and bus 110 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 106 may include, for instance, a cache 112, such as a shared cache, which may be coupled to local caches 114 of one or more processors 104 via, e.g., one or more buses 111. Further, memory 106 may include one or more programs or applications 116, at least one operating system 118, one or more compilers 120 and one or more computer readable program instructions 122. Computer readable program instructions 122 may be configured to carry out functions of embodiments of aspects of the invention.

Computer system 102 may communicate via, e.g., I/O interfaces 108 with one or more external devices 130, such as a user terminal, a tape drive, a pointing device, a display, and one or more data storage devices 134, etc. A data storage device 134 may store one or more programs 136, one or more computer readable program instructions 138, and/or data, etc. The computer readable program instructions may be configured to carry out functions of embodiments of aspects of the invention.

Computer system 102 may also communicate via, e.g., I/O interfaces 108 with network interface 132, which enables computer system 102 to communicate with one or more networks, such as a local area network (LAN), a general wide area network (WAN), and/or a public network (e.g., the Internet), providing communication with other computing devices or systems.

Computer system 102 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 102. Examples, include, but are not limited to: microcode, device drivers, redundant processing units, external disk drive arrays, RAID systems, tape drives, and data archival storage systems, etc.

Computer system 102 may be operational with numerous other general-purpose or special purpose computing system environments or configurations. Examples of well-known computing systems, environments, and/or configurations that may be suitable for use with computer system 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

As described herein, in one aspect, a compiler (e.g., compiler 120) of a processor (e.g., processor 104) transforms computer code by, for instance, replacing one or more portions of the code with other select code that is, e.g., faster and/or otherwise improves execution performance of the code. In one or more aspects, a multi-phase idiom recognition process is provided that detects code patterns within computer code (e.g., applications, programs, modules, functions, procedures, etc.), analyzes value constraints for a matched code pattern and replaces one or more code segments of the computer code with other code to improve execution-time performance of the computer code. As an example, the multi-phase process operates in an intermediate code manipulation phase of an optimizing compiler, such as an IBM® Open XL compiler and/or another compiler offered by International Business Machines Corporation and/or other entities. The IBM® Open XL compiler is just one example of a compiler to incorporate and/or use one or more aspects of the present invention.

In one example, the process is implemented based on a compiler intermediate representation that uses static single assignments: each new assignment of a value to a variable creates a new version of the variable in a static single assignment form such that each use has a unique definition. As used herein, a variable refers to those defined in the static single assignment form, and thus, model expressions, including those dependent on operations that interact with memory at specific points in time.

Figure 2:
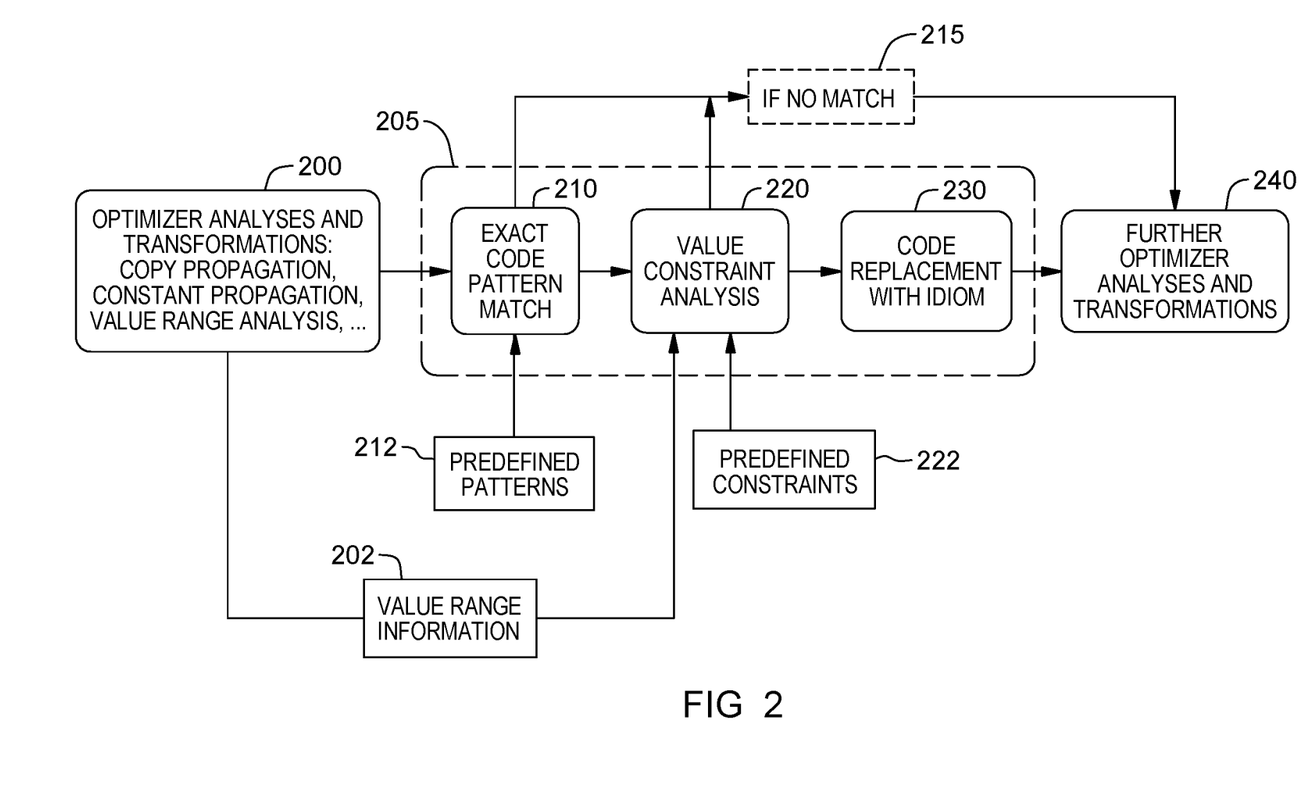
FIG. 2 depicts one example of processing to transform computer code based on idiom recognition and value constraint analysis, in accordance with one or more aspects of the present invention.

One example of processing associated with a multi-phase idiom recognition process, in accordance with one or more aspects of the present invention, is described with reference to FIG. 2. Initially, in one example, the compiler may perform various optimizing transformations 200 on given computer code, such as copy propagation, constant propagation, dead store elimination, and/or loop transformations, as examples, to facilitate code pattern matching on the intermediate code. Further, the compiler may perform various data flow analyses to provide information for a value constraint analysis 220, described below. For instance, the compiler may perform a value range analysis of the given computer code that tracks the range (e.g., interval) of values that the numeric variable(s) can have at each point of the code's execution. This value range information 202 is input to value constraint analysis 220.

Further, in one example, a multi-phase idiom recognition process 205 is performed for the given computer code. For instance, code pattern matching recognition 210 is performed using predefined idiom templates or patterns 212. As an example, predefined patterns (e.g., idiom templates) 212 are input to a code pattern match technique and used in code pattern matching. For instance, the given code is compared against the set of templates to determine if there are any matches in the given computer code to any of the idioms in the templates. As an example, the match is to be an exact match according to certain conditions (e.g., having a certain pattern even if select data items (e.g., constants and variables) have different values than the pattern template). To perform an exact match according to certain conditions, use-definition chains of the computer code are traversed and compared to target patterns templates 212. A use-definition chain is a data structure that includes a use of a variable and definitions of that variable that can reach that use without other intervening definitions (e.g., an assignment of a value to a variable). In one example, the matched code sequence does not have to be contiguous or free of control flow as the technique is comparing the sequence of the use-definition chains.

If the code pattern matching does not produce a match 215, processing continues to further optimizer analyses and transformation 240, in which other optimizations/transformations may be performed. However, if at least one match is found, processing continues with producing, for each matched idiom, a set of constants and variables (e.g., referred to herein as ConstraintValueList) to be analyzed based on predefined constraint conditions 222. The set of constants and variables is predefined for the matched code sequence (i.e., idiom) and is provided in ConstraintValueList. The values associated with the particular constants and/or variables in the ConstraintValueList are obtained from the code representing the matched idiom. Further, a set of constants and variables (e.g., RefValueList) is provided for each idiom to be utilized in transforming the code sequence to the matched idiom for the matched code sequence. Again, the set of constants and variables for the RefValueList is predefined for each idiom.

Processing continues with value constraint analysis 220, which is performed in accordance with one or more aspects of the present invention, to ensure constants and variables in the ConstraintValueList satisfy predefined constraints or conditions for the idiom. By using value constraint analysis, more matches may be found, since an idiom is identified in the given computer code as a match (e.g., an exact match) even if values for certain constants and/or variables differ. Although they differ, they still may be acceptable, based on the value constraint analysis, allowing the code segments in the given code comprising/including the idiom to be replaced with optimized code (e.g., a call to a function, library, etc.).

In one example, value range information 202 and predefined constraints 222 are input to value constraint analysis 220, as well as the ConstraintValueList. The constants and/or variables in the ConstraintValueList are checked against the predefined constraints (e.g., predefined constraints 222). Each predefined constraint for the idiom is checked. The checking may vary on a case-by-case basis. When the value recorded in the ConstraintValueList is an array, a loop is used to check the constraints for each of the array elements. For each variable recorded in the ConstraintValueList, if its value or value range information for the code region is available from range analysis, that information may be considered in the checking of the constraints. The information can be of symbolic or constant values. If any variables recorded in the ConstraintValueList have no value or no value range information available from value range analysis when entering the code region, the analysis performs, e.g., condition simplification to fold the conditions, if possible.

Based on code pattern match 210 indicating a matched idiom and value constraint analysis 220 indicating that the idiom conditions with respect to the ConstraintValueList are satisfied, code replacement is performed 230. As an example, the code is replaced by the idiom's selected expression using, e.g., the RefValueList. Moreover, in one example, if there is no predefined condition for the idiom (e.g., empty ConstraintValueList), code replacement is performed.

Moreover, in one example, further optimization and/or analyses may be performed 240.

If, however, code pattern match 210 indicates a match but value constraint analysis 220 fails 215, code replacement is not performed and processing proceeds to further optimization 240. In one or more embodiments, further optimization 240 and/or optimization 200 are optional.

As described herein, a multi-phase idiom recognition process is performed to optimize code and improve execution performance. One example of such processing is depicted below in, e.g., an LLVM compiler intermediate representation.

Given a constant array:
@ConstantArray=internal constant [64×i64]
[0, 1, 56, 2, 57, 49, 28, 3, 61, 58, 42, 50, 38, 29, 17, 4,
62, 47, 59, 36, 45, 43, 51, 22, 53, 39, 33, 30, 24, 18, 12, 5,
63, 55, 48, 27, 60, 41, 37, 16, 46, 35, 44, 21, 52, 32, 23, 11,
54, 26, 40, 15, 34, 20, 31, 10, 25, 14, 19, 9, 13, 8, 7, 6]
define i64 @Func (i64* %ptr) {
S0: %v64=load i64, i64* %ptr
S1: %sub=sub i64 0, %v64
S2: %and=and i64%v64, %sub
S3: %xor=xor i64%and, %v64
S4: store i64%xor, i64* %ptr
S5: %mul=mul i64%and, 285870213051353865
S6: %shr=lshr i64%mul, 58
S7: %arrayidx=getelementptr [64×164], [64×164]* @ConstantArray, i64 0, i64 %shr
S8: %ret=load i64, i64* %arrayidx
S9: ret i64%ret
}

Initially, starting from load statement S8, traversing through the use-definition chains in the order of S8→S7→S6→S5→S2→S1, the analysis finds that this code sequence matches to, e.g., the De Bruijn algorithm to compute the number of trailing zeros for %v64 (e.g., code pattern match 210). For further confirmation, the analysis records the following values in the ConstraintValueList, the constants and/or variables of such list being predefined for the idiom:

Constant used in statement S5, C=285870213051353865;
Constant used in statement S6, C2=58;
The total number of elements for array ConstantArray, N=64;
The values for the 64 elements of array ConstantArray=the initial values as this is a constant array.

The analysis also records, as predefined for this idiom, the following value in the RefValueList:
The variable i64 %v64

Note that the matched sequence is not contiguous as statements S4 and S3 are not in the sequence.

Next, verification is performed to determine that this code sequence with these values recorded in ConstraintValueList is computing the idiom, i.e., the number of trailing zeros of %v64 (e.g., value constraint analysis 220). For the idiom of counting the number of trailing zeros, these values are to satisfy this predefined constraint (e.g., constraint 222), as an example: for each array element at position I, the result of the computation of ConstantArray[((1<<I)*C)>>(C2=(N−$\log_2$ N))] is of the same value of I. Below is one example of the pseudo-code for constraint checking:

```
bool constraint_checking(C, N, ConstantArray) {
    if (C2!=(N−log2 N)) return false;
    for (int I=0; I & N; ++I) {
        if (ConstantArray[((1<<I)*C)>>(N−log2 N)]!=I)
            return false;
    }
    return true;
}
```

If the function constraint_checking above returns true, then the idiom is confirmed, and the process proceeds to replacing the code with, e.g., an intrinsic function call to, e.g., llvm.cttz (LLVM compiler, Count Trailing Zeros) for variable %v64 recorded in RefValueList (e.g., code replacement 230). For this example, it can be proved that the constraint condition is true for each array element of ConstantArray. So, the code can be replaced by a call to, e.g., llvm.cttz(%v64). llvm.cttz is only one example replacement code for counting zeros. Other replacement codes may also be used to count trailing zeros.

In addition to the above, in one or more embodiments, idiom recognition also provides more opportunities for transformation. Below depicts one example of the resulting code (with, e.g., dead store eliminations and instruction folding):

```
define i64 @Func(i64* %ptr) {
S0: %v64=load i64, i64* %ptr
S1': %add=add i64 %v64, -1
S3: %xor=and i64 %add, %v64
S4: store i64 %xor, i64* %ptr
S8': %ret=llvm.cttz.i64(i64 %v64, i1 false)
S9: ret i64 %ret
}
```

Although in the above code, a count trailing zeros idiom was identified, this is only one example. Additional and/or other idioms may be identified in any given code.

Described herein is a multi-phase idiom recognition technique that identifies candidates for conversion to optimized code (e.g., faster code), such as high performance libraries, to improve performance. Further, in one example, runtime performance is improved by maximizing the use of hardware assist instructions, such as a special purpose instruction, for instance, counting trailing zeros in Power architectures. The multi-phase technique of one or more aspects of the present invention finds matches even when an idiom has a unique code pattern but instances of that code pattern are not uncategorically valid matches of the code pattern. Instead, in one or more aspects, matches of the code pattern are considered matches of the idiom if the values of the variables used in the matched code satisfy certain constraints. Thus, the multi-phase technique identifies more candidates than traditional idiom recognition techniques.

One or more aspects of the present invention are inextricably tied to computer technology and facilitate processing within a computer, improving performance thereof. The use of a process to transform code to execute faster improves performance of the code and the computing environment.

Although embodiments are described herein, other variations and/or embodiments are possible.

Figure 3A:
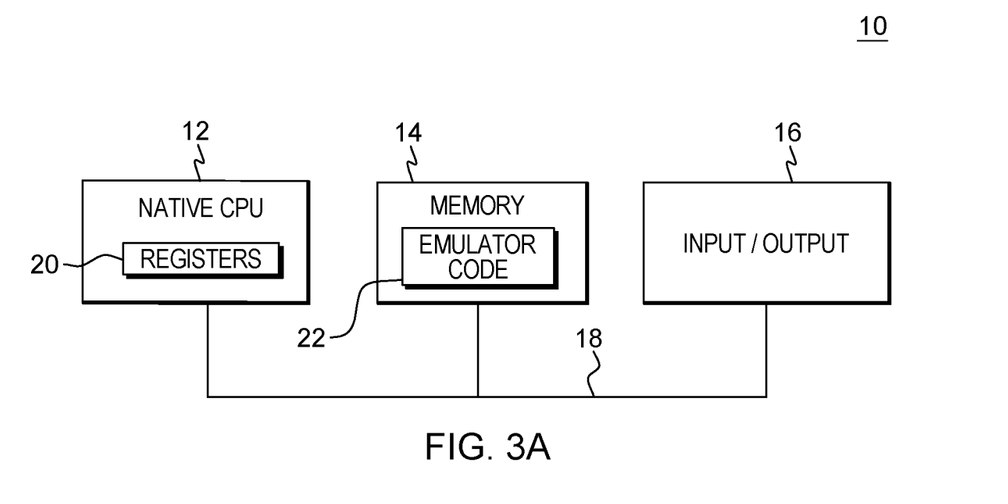
FIG. 3A depicts another example of a computing environment to incorporate and/or use one or more aspects of the present invention.

Another example of a computing environment to incorporate and use one or more aspects of the present invention is described with reference to FIG. 3A. In this example, a computing environment 10 includes, for instance, a native central processing unit (CPU) 12, a memory 14, and one or more input/output devices and/or interfaces 16 coupled to one another via, for example, one or more buses 18 and/or other connections. As examples, computing environment 10 may include an IBM® Power® processor offered by International Business Machines Corporation, Armonk, New York; an HP Superdome with Intel® processors offered by Hewlett Packard Co., Palo Alto, California; and/or other machines based on architectures offered by International Business Machines Corporation, Hewlett Packard, Intel Corporation, Oracle, or others. Intel is a trademark or registered trademark of Intel Corporation or its subsidiaries in the United States and other countries.

Native central processing unit 12 includes one or more native registers 20, such as one or more general purpose registers and/or one or more special purpose registers used during processing within the environment. These registers include information that represents the state of the environment at any particular point in time.

Moreover, native central processing unit 12 executes instructions and code that are stored in memory 14. In one particular example, the central processing unit executes emulator code 22 stored in memory 14. This code enables the computing environment configured in one architecture to emulate another architecture. For instance, emulator code 22 allows machines based on architectures other than, e.g., the IBM® z/Architecture® instruction set architecture, such as Power processors, HP Superdome servers or others, to emulate the z/Architecture instruction set architecture and to execute software and instructions developed based on the z/Architecture instruction set architecture. z/Architecture is a trademark or registered trademark of International Business Machines Corporation in at least one jurisdiction.

Figure 3B:
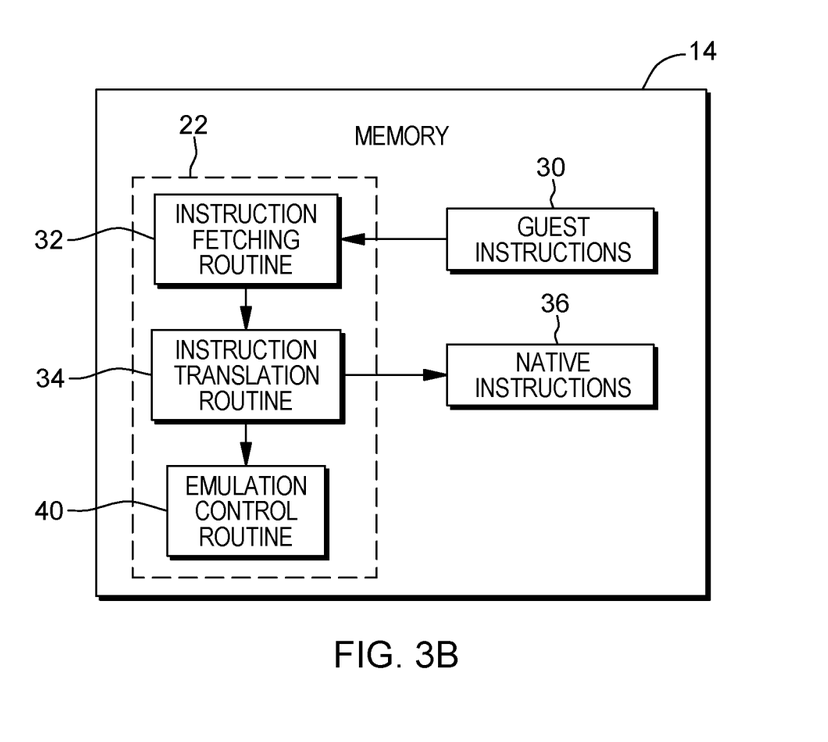
FIG. 3B depicts further details of the memory of FIG. 3A, in accordance with one or more aspects of the present invention.

Further details relating to emulator code 22 are described with reference to FIG. 3B. Guest instructions 30 stored in memory 14 comprise software instructions (e.g., correlating to machine instructions) that were developed to be executed in an architecture other than that of native CPU 12. For example, guest instructions 30 may have been designed to execute on a processor based on the z/Architecture instruction set architecture, but instead, are being emulated on native CPU 12, which may be, for example, an Intel processor. In one example, emulator code 22 includes an instruction fetching routine 32 to obtain one or more guest instructions 30 from memory 14, and to optionally provide local buffering for the instructions obtained. It also includes an instruction translation routine 34 to determine the type of guest instruction that has been obtained and to translate the guest instruction into one or more corresponding native instructions 36. This translation includes, for instance, identifying the function to be performed by the guest instruction and choosing the native instruction(s) to perform that function.

Further, emulator code 22 includes an emulation control routine 40 to cause the native instructions to be executed. Emulation control routine 40 may cause native CPU 12 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 36 may include loading data into a register from memory 14; storing data back to memory from a register; or performing some type of arithmetic or logic operation, as determined by the translation routine.

Each routine is, for instance, implemented in software, which is stored in memory and executed by native central processing unit 12. In other examples, one or more of the routines or operations are implemented in firmware, hardware, software or some combination thereof. The registers of the emulated processor may be emulated using registers 20 of the native CPU or by using locations in memory 14. In embodiments, guest instructions 30, native instructions 36 and emulator code 22 may reside in the same memory or may be disbursed among different memory devices.

The computing environments described above are only examples of computing environments that can be used. Other environments, including but not limited to, non-partitioned environments, partitioned environments, cloud environments and/or emulated environments, may be used;

embodiments are not limited to any one environment. Although various examples of computing environments are described herein, one or more aspects of the present invention may be used with many types of environments. The computing environments provided herein are only examples.

Each computing environment is capable of being configured to include one or more aspects of the present invention. For instance, each may be configured to perform a multi-phase idiom recognition process, transform code to include faster code, and/or perform one or more other aspects of the present invention.

Although various embodiments are described herein, many variations and other embodiments are possible without departing from a spirit of aspects of the present invention. It should be noted that, unless otherwise inconsistent, each aspect or feature described herein, and variants thereof, may be combinable with any other aspect or feature.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
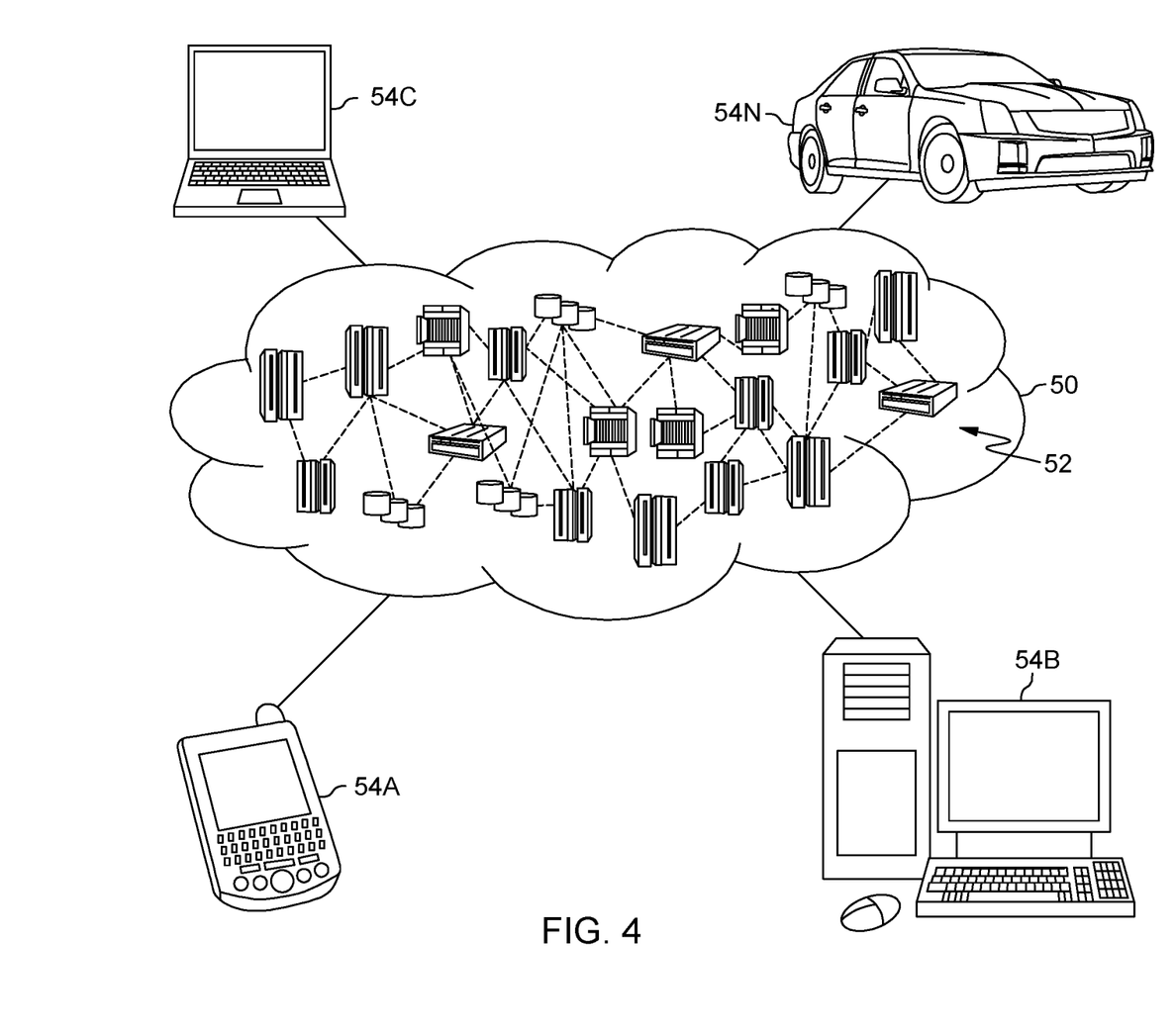
FIG. 4 depicts one embodiment of a cloud computing environment, in accordance with one or more aspects of the present invention.

Referring now to FIG. 4, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 52 and cloud computing environment 50 can communicate with any type of computerized device over any type of network and/or network addressable connection (e.g., using a web browser).

Figure 5:
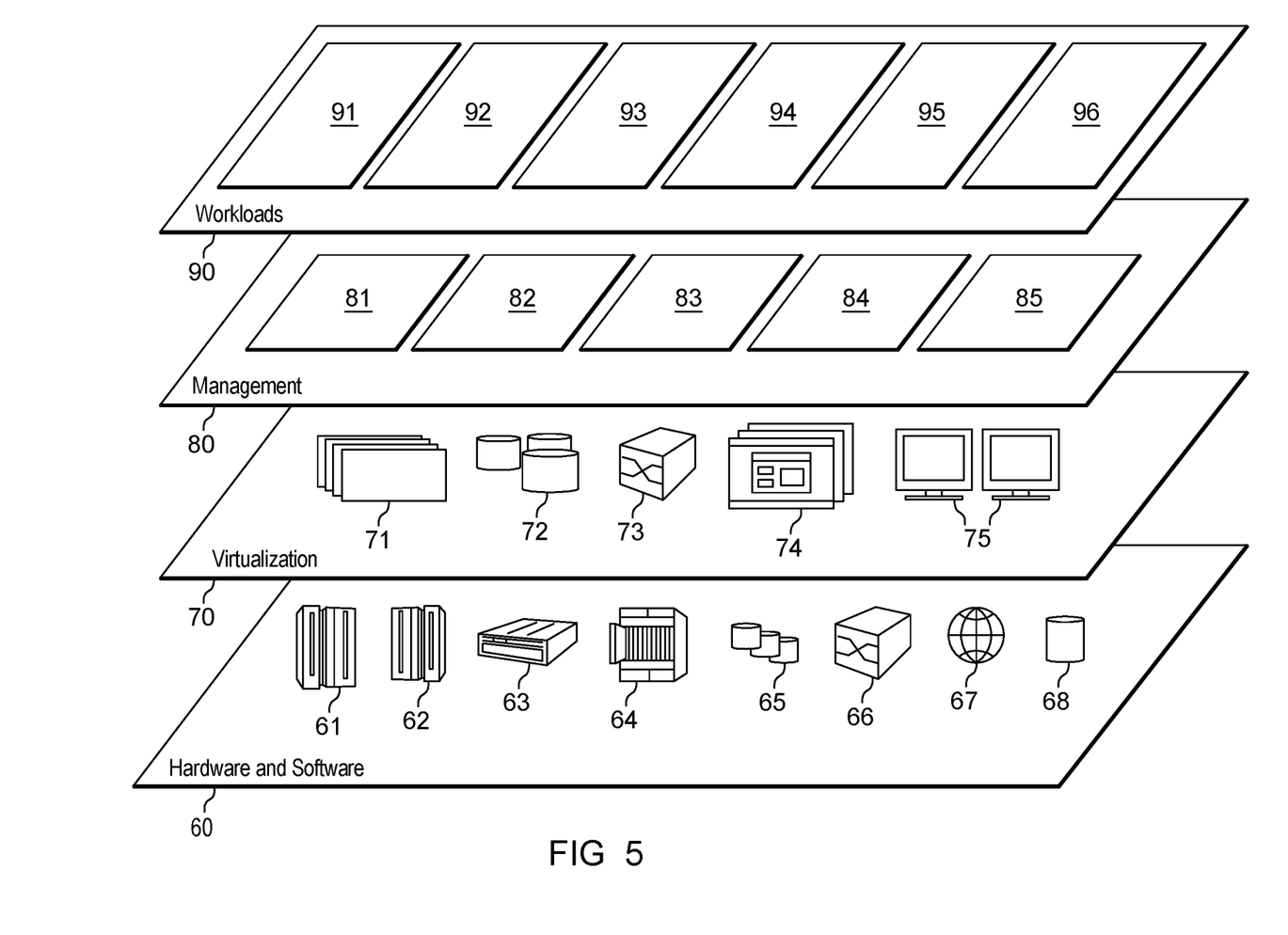
FIG. 5 depicts one example of abstraction model layers, in accordance with one or more aspects of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and multi-phase idiom recognition and/or code transformation processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, different idioms and/or different types of optimizers, pattern matching techniques, constraint analysis, transformation and/or optimizations may be employed. Many variations are possible.

Various aspects are described herein. Further, many variations are possible without departing from a spirit of aspects of the present invention. It should be noted that, unless otherwise inconsistent, each aspect or feature described herein, and variants thereof, may be combinable with any other aspect or feature.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
one or more computer readable storage media and program instructions collectively stored on the one or more computer readable storage media to perform a method comprising:
performing, by a compiler executing on a processor, a value range analysis of computer code that is selected, the value range analysis tracking one or more ranges of values for one or more selected variables of the computer code at one or more points in execution of the computer code, and the value range analysis generating value range information;
performing, by the compiler, a multi-phase idiom recognition process to search the computer code being compiled by the compiler for one or more idioms and confirming based on finding the one or more idioms in the computer code that the one or more idioms found actually correspond to one or more particular known idioms, the performing the multi-phase idiom recognition process comprising:
performing, during the multi-phase idiom recognition process, code pattern matching within the computer code to determine whether there is a match in the computer code, according to one or more selected conditions, to an idiom from a predefined set of idioms
based on determining that there is the match in the computer code to the idiom from the predefined set of idioms, confirming, during the multi-phase idiom recognition process, that the idiom found in the computer code is actually a particular known idiom, the confirming comprising:
providing, based on determining that the computer code includes the idiom from the predefined set of idioms, a set of data items of the idiom to be analyzed against the value range information generated from the value range analysis and one or more corresponding values taken from the computer code representing the idiom that is the match;
providing a reference set of data items, representing the idiom, to be used to transform the computer code based on confirming the idiom is the particular known idiom; and
analyzing, based on a set of constraints defined for the particular known idiom, the set of data items of the idiom with respect to the one or more corresponding values taken from the computer code and the value range information generated from the value range analysis to determine whether the set of data items satisfy one or more predefined conditions for the particular known idiom, wherein the idiom is confirmed as the particular known idiom based on the set of data items satisfying the one or more predefined conditions for the particular known idiom; and
transforming, by the compiler, the computer code being compiled to provide revised computer code, the transforming comprising replacing, based on confirming that the idiom found in the computer code is the particular known idiom, one or more code segments of the computer code with replacement code to provide the revised computer code, wherein the replacement code is a selected expression of the particular known idiom and uses the reference set of data items; and
compiling, using the compiler, the revised computer code improving execution performance of the computer code.

2. The computer program product of claim 1, wherein the set of data items includes one or more constants.

3. The computer program product of claim 1, wherein the set of data items includes one or more variables.

4. The computer program product of claim 1, wherein the method further comprises performing one or more transformations on the revised computer code to optimize the revised computer code.

5. The computer program product of claim 1, wherein the method further comprises performing one or more transformations on the computer code prior to performing code pattern matching to facilitate the code pattern matching.

6. The computer program product of claim 1, wherein the replacement code comprises a call to the particular known idiom.

7. The computer program product of claim 1, wherein the performing code pattern matching includes traversing and comparing one or more use-definition chains of the computer code to predefined idiom templates to determine whether the computer code includes the idiom, wherein a use-definition chain of the one or more use-definition chains includes a use of a variable and definitions of that variable that can reach that use without other intervening definitions.

8. A computer system for facilitating processing within a computing environment, the computer system comprising:
a memory; and
at least one processor in communication with the memory, wherein the computer system is configured to perform a method, said method comprising:
performing, by a compiler executing on a processor, a value range analysis of computer code that is selected, the value range analysis tracking one or more ranges of values for one or more selected variables of the computer code at one or more points in execution of the computer code, and the value range analysis generating value range information;
performing, by the compiler, a multi-phase idiom recognition process to search the computer code being compiled by the compiler for one or more idioms and confirming based on finding the one or more idioms in the computer code that the one or more idioms found actually correspond to one or more particular known idioms, the performing the multi-phase idiom recognition process comprising:
performing, during the multi-phase idiom recognition process, code pattern matching within the computer code to determine whether there is a match in the computer code, according to one or more selected conditions, to an idiom from a predefined set of idioms;
based on determining that there is the match in the computer code to the idiom from the predefined set of idioms, confirming, during the multi-phase idiom recognition process, that the idiom found in the computer code is actually a particular known idiom, the confirming comprising:
providing, based on determining that the computer code includes the idiom from the predefined set of idioms, a set of data items of the idiom to be analyzed against the value range information generated from the value large analysis and one or more corresponding values taken from the computer code representing the idiom that is the match;

providing a reference set of data items, representing the idiom, to be used to transform the computer code based on confirming the idiom is the particular known idiom; and analyzing, based on a set of constraints defined for the particular known idiom, the set of data items of the idiom with respect to the one or more corresponding values taken from the computer code and the value range information generated from the value range analysis to determine whether the set of data items satisfy one or more predefined conditions for the particular known idiom, wherein the idiom is confirmed as the particular known idiom based on the set of data items satisfying the one or more predefined conditions for the particular known idiom; and transforming, by the compiler, the computer code being compiled to provide revised computer code, the transforming comprising replacing, based on confirming that the idiom found in the computer code is the particular known idiom, one or more code segments of the computer code with replacement code to provide the revised computer code, wherein the replacement code is a selected expression of the particular known idiom and uses the reference set of data items; and compiling, using the compiler, the revised computer code improving execution performance of the computer code.

9. The computer system of claim 8, wherein the replacement code comprises a call to the particular known idiom.

10. The computer system of claim 8, wherein the performing code pattern matching includes traversing and comparing one or more use-definition chains of the computer code to predefined idiom templates to determine whether the computer code includes the idiom, wherein a use-definition chain of the one or more use-definition chains includes a use of a variable and definitions of that variable that can reach that use without other intervening definitions.

11. The computer system of claim 8, wherein the set of data items includes one or more constants.

12. The computer system of claim 8, wherein the set of data items includes one or more variables.

13. The computer system of claim 8, wherein the method further comprises performing one or more transformations on the revised computer code to optimize the revised computer code.

14. A computer-implemented method of facilitating processing within a computing environment, the computer-implemented method comprising:

performing, by a compiler executing on a processor, a value range analysis of computer code that is selected, the value range analysis tracking one or more ranges of values for one or more selected variables of the computer code at one or more points in execution of the computer code, and the value range analysis generating value range information;

performing, by the compiler, a multi-phase idiom recognition process to search the computer code being compiled by the compiler for one or more idioms and confirming based on finding the one or more idioms in the computer code that the one or more idioms found actually correspond to one or more particular known idioms, the performing the multi-phase idiom recognition process comprising:

performing, during the multi-phase idiom recognition process, code pattern matching within the computer code to determine whether there is a match in the computer code, according to one or more selected conditions, to an idiom from a predefined set of idioms;

based on determining that there is the match in the computer code to the idiom from the predefined set of idioms, confirming, during the multi-phase idiom recognition process, that the idiom found in the computer code is actually a particular known idiom, the confirming comprising:

providing, based on determining that the computer code includes the idiom from the predefined set of idioms, a set of data items of the idiom to be analyzed against the value range information generated from the value range analysis and one or more corresponding values taken from the computer code representing the idiom that is the match;

providing a reference set of data items, representing the idiom, to be used to transform the computer code based on confirming the idiom is the particular known idiom; and analyzing, based on a set of constraints defined for the particular known idiom, the set of data items of the idiom with respect to the one or more corresponding values taken from the computer code and the value range information generated from the value range analysis to determine whether the set of data items satisfy one or more predefined conditions for the particular known idiom, wherein the idiom is confirmed as the particular known idiom based on the set of data items satisfying the one or more predefined conditions for the particular known idiom; and transforming, by the compiler, the computer code being compiled to provide revised computer code, the transforming comprising replacing, based on confirming that the idiom found in the computer code is the particular known idiom, one or more code segments of the computer code with replacement code to provide the revised computer code, wherein the replacement code is a selected expression of the particular known idiom and uses the reference set of data items; and compiling, using the compiler, the revised computer code improving execution performance of the computer code.

15. The computer-implemented method of claim 14, wherein the replacement code comprises a call the particular known idiom.

16. The computer-implemented method of claim 14, further comprising performing one or more transformations on the computer code prior to performing code pattern matching to facilitate the code pattern matching.

17. The computer-implemented method of claim 14, wherein the set of data items includes one or more constants.

18. The computer-implemented method of claim 14, wherein the set of data items includes one or more variables.

19. The computer-implemented method of claim 14, wherein the method further comprises performing one or more transformations on the revised computer code to optimize the revised computer code.

20. The computer-implemented method of claim 14, wherein the performing code pattern matching includes traversing and comparing one or more use-definition chains of the computer code to predefined idiom templates to determine whether the computer code includes the idiom, wherein a use-definition chain of the one or more use-definition chains includes a use of a variable and definitions of that variable that can reach that use without other intervening definitions.

* * * * *